No. 844,650. PATENTED FEB. 19, 1907.
T. E. BARNUM.
ALTERNATING CURRENT RETAINING DEVICE FOR ELECTRIC MOTOR CONTROLLERS.
APPLICATION FILED NOV. 2, 1903.
3 SHEETS—SHEET 1.
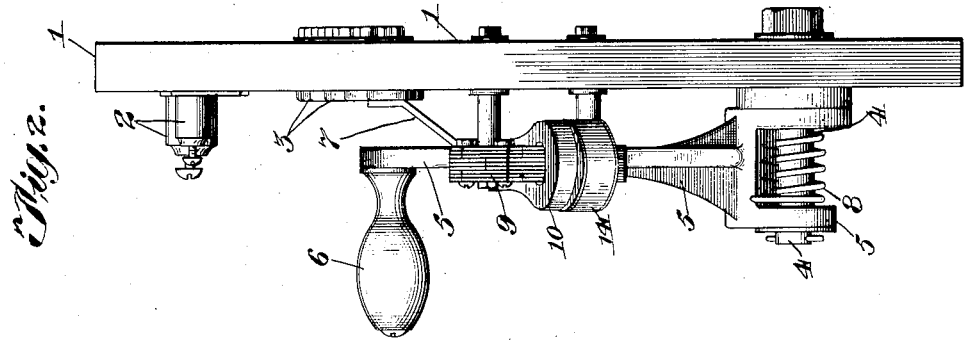
Witnesses:
Inventor
Thomas E. Barnum
by Jones & Addington
Attorneys.

No. 844,650. PATENTED FEB. 19, 1907.
T. E. BARNUM.
ALTERNATING CURRENT RETAINING DEVICE FOR ELECTRIC MOTOR
CONTROLLERS.
APPLICATION FILED NOV. 2, 1903.

3 SHEETS—SHEET 2.

Fig. 4.
Fig. 3.
Fig. 5.
Fig. 6.
Fig. 7.
Fig. 8.

Witnesses:
C. M. Wennich
Edwin B. H. Tower Jr

Inventor:
Thomas E. Barnum
by James Raddington
Attorneys.

No. 844,650. PATENTED FEB. 19, 1907.
T. E. BARNUM.
ALTERNATING CURRENT RETAINING DEVICE FOR ELECTRIC MOTOR CONTROLLERS.
APPLICATION FILED NOV. 2, 1903.
3 SHEETS—SHEET 3.
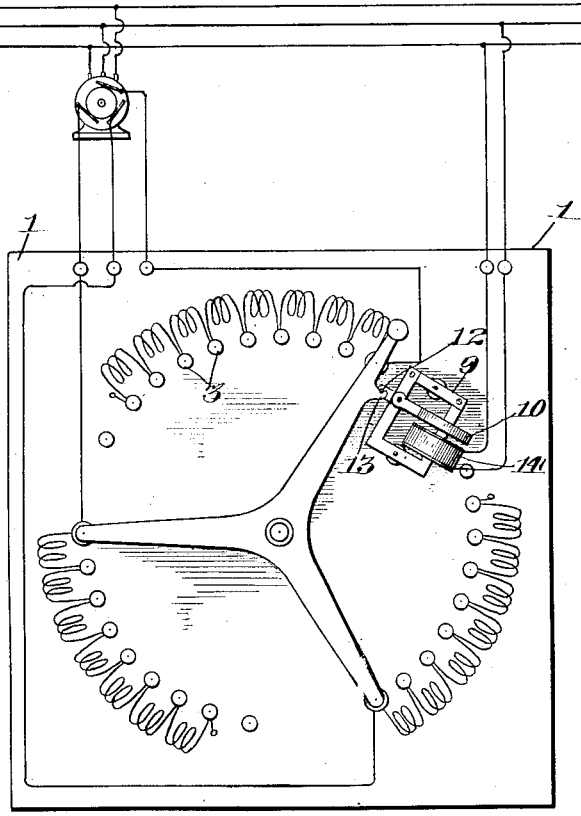
Fig. 9.
Fig. 11.  Fig. 10.
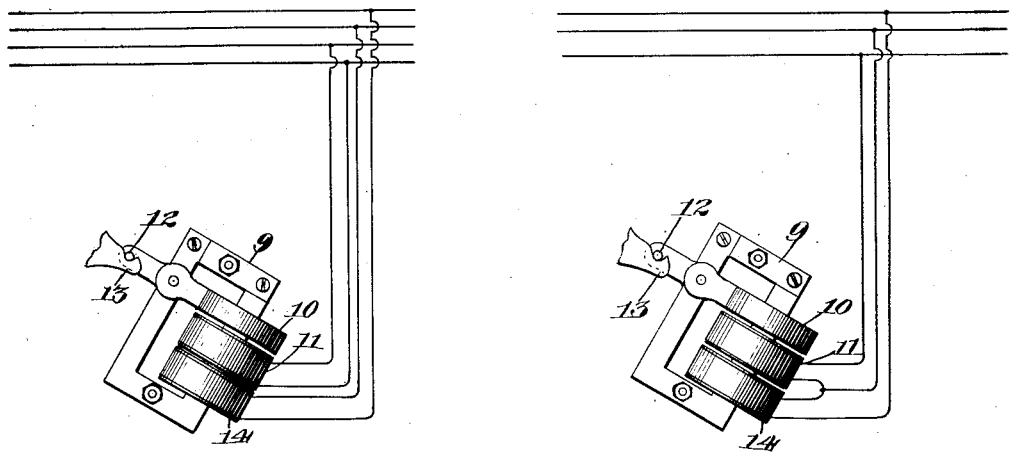
Witnesses:
Inventor:
Thomas E. Barnum
by Jones & Addington
Attorneys.

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

ALTERNATING-CURRENT-RETAINING DEVICE FOR ELECTRIC-MOTOR CONTROLLERS.

No. 844,650.     Specification of Letters Patent.     Patented Feb. 19, 1907.

Application filed November 2, 1903. Serial No. 179,548.

*To all whom it may concern:*

Be it known that I, THOMAS E. BARNUM, a citizen of the United States, residing at Milwaukee, in the county of Milwaukee and State of Wisconsin, have invented a certain new and useful Improvement in Alternating-Current-Retaining Device for Electric-Motor Controllers, of which the following is a full, clear, concise, and exact description, reference being had to the accompanying drawings, forming a part of this specification.

My invention relates to an electroresponsive device which is responsive to an alternating current.

It has been designed particularly for controlling electric circuits; but it may be applied in various other ways.

In some instances I arrange my invention to retain the operative parts of a switch, rheostat, or electric-motor controller or starter in certain predetermined positions during the existence of normal electrical conditions and to release said parts when the electrical conditions are abnormal. The ordinary form of retaining-magnet is not suitable for this purpose where an alternating current is used and the operative parts are automatically moved when released, as a continual buzzing or noise is produced by the armature of the magnet when the device is in use.

In employing my invention in the way suggested I preferably provide a latch, which is operated by the repulsion between an electromagnetic winding connected in an alternating-current circuit and a second winding influenced by the first-mentioned winding to hold the movable parts of the rheostat-switch, controller, or other device, as the case may be, in a predetermined position while the current is normal.

In the accompanying drawings I have shown one embodiment of my invention, and the several views illustrated are as follows:

Figure 1 is a face view of a motor-starter having my improved retaining device for the contact-lever. Fig. 2 is a side view thereof. Fig. 3 is a sectional view taken through the magnet-frame on the line 3 3, Fig. 1, and looking in the direction of the arrow. Fig. 4 is a view of the magnet-frame with the top section thereof removed. Fig. 5 is a plan view of the part illustrated in Fig. 4. Figs. 6 and 7 are plan and front views, respectively, of the top section of the magnet-frame. Fig. 8 is a diagram showing the manner of connecting my improved retaining device in a single-phase alternating-current circuit. Fig. 9 shows diagrammatically a three-phase motor and starter and the manner of connecting the same in a three-phase alternating-current circuit. Fig. 10 shows a modification of my retaining device and the manner of connecting the same in a two or three phase three-wire alternating-current circuit; and Fig. 11 is a view of the same modification of my invention as is exemplified in Fig. 10, but showing the same connected in a two-phase four-wire alternating-current circuit.

The starter or controller illustrated in Fig. 1 is particularly designed for a motor to be operated on a single-phase alternating-current circuit. As is usual in such devices, upon a base or board 1, having binding-posts 2, is arranged a series of contacts or buttons 3, between which are connected the subdivisions of a resistance. To a post 4, fastened to said base, is pivoted an arm or lever 5, having a handle 6 for moving the same and a brush 7 arranged to slide over said contacts. This arm is normally held in its initial position at the left, as indicated in dotted lines, by a spring 8, preferably fixed at one end to said post and at the opposite end to said arm, and then the circuit controlled by the starting device is open. When the arm is swung toward the right, the circuit is closed, and the subdivisions of the resistance are removed from the circuit one by one as the brush engages the successive contacts until the arm reaches the "on" position, as it is shown in the full lines, when all the resistance is removed from the circuit. If the arm be released by the hand of the operator before it reaches the on position at the right, it will be returned to its initial position by the spring at its hub; but at the full on position said arm will be latched and retained during the normal operation of the motor by the device now to be described. Also mounted upon said base, together with the parts before described, is a magnet-frame 9, which is, by preference, rectangular in form and made in two sections, the lower section comprising the sides and bottom of the frame and the upper section the top thereof. The sections of the frame are preferably laminary, and the plates which compose said sections of the frame are preferably punched from sheet-iron and bolted or riveted together. The plates which make up the lower sections have one side longer than the other, as shown in Fig. 4, and are assembled in the frame with the long side of some of the plates and the short side of others at each side of the frame, so that a mortise is formed at the top of one side of the lower section of the frame and a tenon at the top of the other side thereof, as illustrated in Figs. 4 and 5. The plates of the top section are laid upon one another with some of the plates projecting beyond the ends of the others in the manner illustrated in Figs. 6 and 7 in order to provide a mortise at one end of said section and a tenon at the other. The two sections thus constructed are placed together with the tenon of the lower section fitted into the mortise of the upper section and the tenon of the upper section inserted in the mortise of the lower section, and preferably bolted one to the other.

To one side of the stationary frame 9 is pivoted a movable frame 10, which is preferably constructed of cast-copper and carries at one end a winding 11, which surrounds the opposite side of said stationary frame and loosely fits about the same, so as to permit said movable frame to oscillate upon its pivot. The winding is preferably of very low resistance and may consist of a single ring formed integral with the movable frame, as shown, or several rings or a few turns of wire. The opposite end of said movable frame carries a pin or projection 12, which is disposed to engage a stop or catch 13, mounted on the contact lever or arm when said arm is in the on position. Beneath the secondary winding carried by the movable frame is a main or primary winding 14, preferably of high resistance, which surrounds one side of the stationary frame. When the primary winding is energized, it induces in the secondary winding a heavy current, and the reaction between the magnetic fields excited by said windings causes said secondary winding to be repelled from said primary winding.

When the contact-lever of the starter is moved into the on position, it will be latched by the pin carried on the movable frame or part, being pressed into a notch or recess under the repulsion between the secondary winding and the main or primary winding. The walls against which the pin bears to latch the contact-lever in the on position is so formed that if at any time the repulsion between the windings should cease or weaken to a certain degree the pin would be raised from its seat in the catch and the contact lever or arm permitted to be thrown back to its initial or "off" position by the spring. The repulsion between the windings will of course continue or be sufficient to latch the contact lever or arm in the on position as long as the motor-circuit remain unbroken or the current does not fall below a predetermined value. In bringing the contact-lever to the on position the pin carried by the movable frame will be raised, so that it may pass into its seat in the recess in the catch of the latch by a forwardly-inclined portion of said catch, which will engage said pin.

In most instances the primary winding of the retaining device will, by preference, be connected directly across the line. The form of starter or controller which I have previously been describing is diagrammatically illustrated in Fig. 8 as connected in circuit with a motor. The motor 15, which may be of any type, is connected between the conductors 16 and 17 of a single-phase alternating-current circuit, and one brush of the commutator of the armature is connected by conductor 18 with the arm or lever of the starter, while the other brush is connected by conductor 19 with the last resistance contact or button of the starter or controller. The main or primary winding 14 of the retaining device is connected directly between the conductors 16 and 17 by the wires 20 and 21. The contact lever or arm of the starter or controller is shown as held in the on position with all of the resistance 22 removed from the circuit. If for any reason the current supplied to the motor by conductors 16 and 17 should fail or fall below a predetermined value, then the repulsion which operates the latch will cease or weaken to such a degree that the contact arm or lever will be permitted to return to its initial or off position (indicated in dotted lines) under the action of the spring. This will break the armature-circuit, and the motor cannot be again started without manually operating the contact lever or arm of the starter or controller.

A starter or controller designed for a motor to be operated upon a two or three phase three-wire alternating-current circuit is shown in Fig. 9. The motor is connected in the circuit in the usual manner, and the brushes for the commutator of the armature are each connected to a separate resistance in the starter. The contact-lever of the starter has three arms, each of which carries a brush adapted to sweep over suitable contacts or buttons connected with said resistance. Like in the single-phase starter a spring is provided for normally retaining the lever in its initial position, and when the lever is in such position the armature-circuit is open. When, however, said lever is thrown to the full on position, it is retained against being returned to its initial position through the agency of the spring during the normal operation of the motor by a retaining device similar to that previously described. The main or primary winding of the retaining device in this form of starter is connected between only two of the wires of the circuit, as shown.

In some instances it may be desirable to have two main or primary windings, and such I have shown in Figs. 10 and 11. The manner of connecting the two primary windings in a two or three phase three-wire alternating-current circuit is suggested in Fig. 10. One terminal of each of said windings is connected to the same wire of the circuit, while the opposite terminal of said windings are each connected to different wires.

In Fig. 11 is illustrated the way of connecting the two main or primary windings upon a four-wire two-phase alternating-current circuit. As is shown, one winding is connected between one set of the wires of the circuit, while the other winding is connected between the other set of said wires.

Where my invention is employed, as herein shown, the rheostat, starter, or controller may be of any design and capable of either breaking the circuit or introducing resistance therein on the occurrence of an abnormal current. Of course my invention may be embodied in many ways other than illustrated herein and arranged to operate in various manners. Sometimes my invention may be used in connection with switches, circuit-breakers, and closers or other circuit-controllers.

While I have herein shown and described my invention as applied to an underload device, yet it is equally applicable to an overload device. In the latter instance the windings would be arranged so that the repulsion between the same when the current reaches a definite value would be sufficient to release or move a switch or other device. Besides this there are many other instances where my invention may be arranged to permit a movable part to normally remain in a stationary position and to move or affect the same on the occurrence of an abnormal current.

The construction of the various elements or parts herein set forth to disclose my invention may all be changed in many ways. Moreover, the windings and circuit arrangements may all be developed to suit the circumstances. It is therefore intended that the appended claims not only cover the different ways suggested herein of embodying my invention, but also the many modifications thereof which may be made.

Having described my invention, what I claim as new, and desire to secure by Letters Patent, is—

1. The combination with an alternating-current-supply circuit, of an alternating-current motor associated therewith, a resistance therefor, a movable element for controlling said resistance, and a retaining-magnet connected with said supply-circuit and responsive to an alternating current for retaining said resistance-varying element in a predetermined position.

2. The combination with an alternating-current-supply circuit, of an alternating-current motor associated therewith, a resistance therefor, a movable element for controlling said resistance, and a retaining-magnet connected with said supply-circuit and responding to an alternating current for holding said movable element in a predetermined position during the existence of a normal current.

3. The combination with an alternating-current-supply circuit, of an alternating-current motor associated therewith, a resistance therefor, a movable element for controlling said resistance, a retaining-magnet connected with said supply-circuit and responsive to an alternating current for holding said movable element in a predetermined position during the existence of a normal current, and means for automatically moving said movable element when the same is released by said device.

4. The combination with an alternating-current-supply circuit, of an alternating-current motor associated therewith, a resistance therefor, a movable element for controlling said resistance, a retaining-magnet connected with said supply-circuit and responsive to an alternating current, and means operated by said device during the existence of a normal current to retain said movable element in a predetermined position.

5. The combination with an alternating-current motor, of a resistance therefor, a movable element for controlling said resistance, an electroresponsive device responsive to an alternating current, and a latch operated by said device during the existence of a normal current to hold said movable element in a predetermined position.

6. The combination with an alternating-current motor, of a resistance therefor, a movable element for controlling said resistance, an electroresponsive device responding to an alternating current, a latch operated by said device, during the existence of a normal current to retain said resistance-varying element in a predetermined position, and means for automatically moving said movable element when the same is released by said latch.

7. The combination with an alternating-current motor, of a resistance therefor, a movable element for controlling said resistance, a primary winding connected in an alternating-current circuit, a secondary winding influenced by said primary winding, and means operated by the repulsion between said windings for holding said movable element in a predetermined position.

8. The combination with an alternating-current motor, of a resistance therefor, a movable element for controlling said resistance, a primary winding connected in an alternating-current circuit, a secondary winding influenced by said primary winding, means operated by the repulsion between said windings for holding said movable element in a predetermined position, and means for automatically moving said movable element when the same is released.

9. The combination with an alternating-current motor, of a resistance therefor, a movable element for controlling said resistance, a primary winding connected in an alternating-current circuit, a secondary winding influenced by said winding, and a latch operated by the repulsion between said windings for holding said movable element in a predetermined position.

10. The combination with an alternating-current motor, of a resistance therefor, a movable element for controlling said resistance, means for normally retaining said element in its initial position, a primary winding connected in an alternating-current circuit, a secondary winding influenced by said primary winding, and means operated by the repulsion between said windings to retain said movable element in a predetermined position.

11. The combination with a circuit-controller, of a stationary frame, an electromagnetic winding mounted upon said frame, a pivoted frame, a winding carried by said pivoted frame and arranged in proximity to the winding carried by said stationary frame, and a latch operated by said pivoted frame when said windings are energized to retain said circuit-controller in a predetermined position.

12. The combination with a circuit-controller, of a stationary frame, an electromagnetic winding mounted upon said frame, a pivoted frame, a winding carried by said pivoted frame and arranged in proximity to the winding carried by said stationary frame, a latch operated by said pivoted frame when said windings are energized to retain said circuit-controller in a predetermined position, and means to move said controller when released.

13. The combination with a circuit-controller, of a stationary laminated frame made in sections, a primary winding carried by said frame and adapted to be energized by an alternating current, a movable frame pivoted to said stationary frame and having a secondary winding arranged to be inductively influenced by said primary winding, and a latch operated by said movable frame when said windings are energized to retain said controller in a predetermined position.

14. The combination with a circuit-controller, of a laminated frame made in sections, a primary winding carried by said frame and adapted to be energized by an alternating current, a movable frame pivoted to said stationary frame and having a secondary winding arranged to be inductively influenced by said primary winding, a latch operated by said movable frame when said windings are energized to retain said controller in a predetermined position, and means for automatically moving said circuit-controller when released.

15. In a device of the character described, the combination with a primary winding, of a secondary winding inductively influenced thereby, a movable element arranged to sweep over contacts connected with a resistance, and arranged to be held in a predetermined point by said secondary member when the same is repelled from said primary member by the reaction between the magnetic fields of said members.

In witness whereof I have hereunto subscribed my name in the presence of two witnesses.

THOMAS E. BARNUM.

Witnesses:
HENRY A. VOGT,
WALTER E. SARGENT.